Oct. 24, 1967

C. R. GOLLNICK

3,348,708

REFUSE VEHICLE

Filed July 13, 1965

Inventor
Cyril R. Gollnick,
By Grist, Lockwood Greenawalt & Dewey
Attys

Oct. 24, 1967 C. R. GOLLNICK 3,348,708
REFUSE VEHICLE

Filed July 13, 1965 12 Sheets-Sheet 6

Inventor:
Cyril R. Gollnick,
By Strist, Lockwood, Greenawalt & Dewey
Attys.

Oct. 24, 1967  C. R. GOLLNICK  3,348,708
REFUSE VEHICLE
Filed July 13, 1965  12 Sheets-Sheet 10

Inventor:
Cyril R. Gollnick,
By Grist, Lockwood Drumwalt & Dewey
Attys

Oct. 24, 1967     C. R. GOLLNICK     3,348,708
REFUSE VEHICLE Filed July 13, 1965     12 Sheets-Sheet 12

Inventor
Cyril R. Gollnick,
By Geist, Lockwood, Greenawalt & Dewey
Attys

United States Patent Office 3,348,708
Patented Oct. 24, 1967

3,348,708
REFUSE VEHICLE
Cyril R. Gollnick, Oshkosh, Wis., assignor to Leach Company, Oshkosh, Wis., a corporation of Wisconsin
Filed July 13, 1965, Ser. No. 471,594
16 Claims. (Cl. 214—83.3)

ABSTRACT OF THE DISCLOSURE

The refuse vehicle includes a storage body and a loading hopper at the rear end thereof. The loading hopper has an arcuate bottom portion joining with the floor of the storage body, which bottom portion defines a segment of an imaginary horizontally disposed cylinder. A single packer plate moves through a cycle for forcing refuse in the hopper into the storage body. The packer plate mounts a pair of sliding pivots at respective side edges thereof and adjacent the forward or leading edge of the packer plate. These pivots are received in rearwardly and downwardly inclined guide tracks mounted to the hopper walls. Each cylinder of a first pair of fluid-operated cylinders has one end thereof pivoted to the hopper and the other end thereof pivotally connected to the packer plate adjacent the sliding pivots. Each fluid-operated cylinder of a second pair of such cylinders has one end thereof pivoted to the hopper and the other end thereof pivoted to the packer plate adjacent the rearward or trailing edge thereof. The fixed pivot axis of the second fluid-operated cylinders is preferably substantially colinear with the axis of the aforementioned imaginary cylinder.

A directional control valve mechanism sequentially operates the aforementioned fluid-operated cylinders for moving the packer plate through its cycle of operation. This directional control valve mechanism includes cams for operating spool valves, which cams are fixed on a shaft also having fixed thereto a ratchet wheel. This ratchet wheel is operated by a pawl mounted on a sleeve coaxial with the shaft. This pawl is operated by an actuating cylinder in fluid-pressure communication with the aforementioned fluid-operated cylinders, thereby to sense pressure build up in the latter for actuating the spool valves.

A hopper door mechanism is mounted by an overcenter linkage mechanism for counterbalancing the weight of the hopper door. A cable connects the hopper door with the packer plate for automatic closing of the former upon movement of the packer plate in forcing refuse from the hopper to the storage body.

This invention has to do with large capacity vehicles of the type used for the collection, compaction and transportation of refuse, garbage, and the like.

The principal object of the invention is to provide, in a vehicle of the type including a storage body and an adjacent loading hopper, new and improved means for transferring the refuse from the loading hopper into the storage body and for compacting the refuse within the body.

Another object is to provide, in a vehicle of the type including a packer plate movably mounted by fluid cylinders, new and improved means for actuating a directional control valve which is associated with the fluid cylinders for operating the latter.

Still another object of the present invention is to provide, in association with a vehicle of the type described, new and improved means for mounting the hopper door and connecting the same with the packer plate so that movement of the latter causes opening of the hopper door.

While the foregoing statements are indicative of the nature of the invention, other objects and advantages will become apparent from an understanding of the following specification disclosing the construction, arrangement and operation of the vehicle of this invention.

One embodiment of the invention is presented herein by way of illustration, but it will be understood that the invention is capable of being incorporated in other structurally modified forms coming equally within the spirit of the invention and the scope of the appended claims.

Referring now particularly to FIGS. 1 through 5, the refuse vehicle will be seen to include a large storage body 10 having a receiving or loading hopper 11 mounted at the rear end of the former. It will be understood that the receiving hopper and storage body are in communication with each other. The loading hopper 11 includes a loading opening 12 which is at times closed by a hopper door 13; the mounting of this hopper door will be explained hereinbelow. The hopper includes an arcuate bottom section 15. This arcuate bottom section defines a segment of an imaginary, horizontally disposed cylinder which has its longitudinal central axis represented by the numeral 16 in FIGS. 2 through 5. The forward transverse edge of hopper bottom section 15 joins with the bottom 17 of storage body 10.

Loading hopper 11 is pivotally connected to storage body 10 by means of a pair of pivotal connections 19. These pivotal connections permit the loading hopper to be swung upwardly and rearwardly into an out-of-the-way position to enable the contents of the storage body, after the body has been filled, to be discharged rearwardly upon the body being tilted downwardly and rearwardly by conventional mounting and operating means (not shown). Numeral 20 represents a compaction or push-out plate which coacts with the packer plate to compress the refuse and also acts to push the compacted refuse out of the body. For a more detailed explanation of the compaction plate, reference should be made to my copending application Ser. No. 304,373, filed Aug. 26, 1963, now United States Patent 3,220,586.

Figure 1:
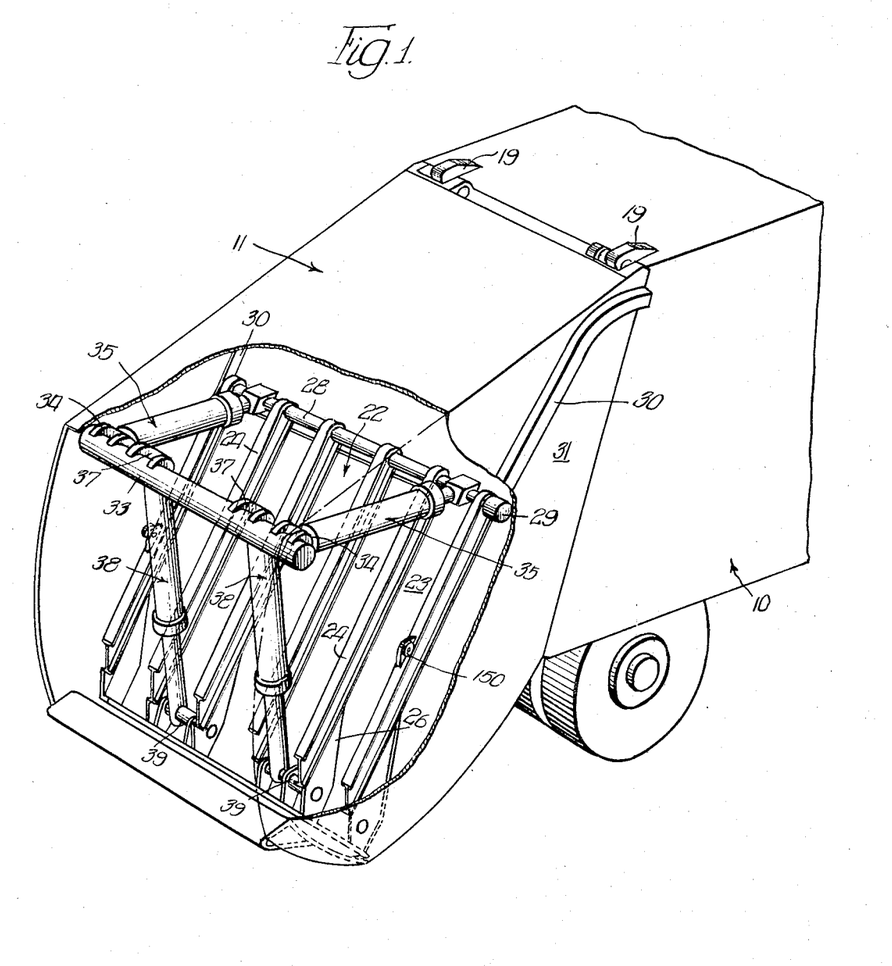
FIG. 1 is a fragmentary perspective view of a refuse vehicle (as seen from the rear and to the right side thereof) with a portion of the loading hopper wall being broken away for better illustration of the construction and mounting of the packer plate.

As seen in FIG. 1, the loading hopper 11 has mounted therein a packer plate 22. The packer plate includes a large plate 23 reinforced by a plurality of parallel, spaced structural members 24, which may be I-beams for example. Plate 23 is bent adjacent the trailing edge thereof to form a lip portion 25 of the packer plate. Suitable web plates 26 are provided for bracing the lip portion 25 of the packer plate.

The leading or forward edge of the packer plate 22 is defined by a cross rod 28. This cross rod is suitably mounted in apertures in structural members 24. Cross rod 28 mounts a roller 29 at each end thereof, each of which rollers is received within a guide track 30 suitably mounted or formed in each side wall 31 of the loading hopper 11. As best noted in FIGS. 4 and 5, the guide tracks are inclined downwardly and rearwardly in the hopper and are curved at their upper ends toward the storage body 10.

A tube 33 is suitably mounted within the hopper in transverse relation with the latter. Tube 33 mounts a pair of separate bracket assemblies 34, which bracket assemblies in turn pivotally mount corresponding ends of a pair of hydraulic piston and cylinder assemblies 35. Hydraulic piston and cylinder assemblies 35 are pivotally connected at their other ends to rod 28 adjacent opposite ends of the latter.

Tube 33 also mounts separate bracket assemblies 37, which bracket assemblies pivotally mount corresponding ends of a pair of hydraulic piston and cylinder assemblies 38. Each hydraulic piston and cylinder assembly 38 has its other end pivotally connected with the packer plate adjacent the trailing or rearward edge of the latter by a suitable pivotal connection designated 39. It will be understood that the axes of pivot between bracket assemblies 37 and piston and cylinder assemblies 38 are colinear with each other and are both substantially coincident with axis 16 of the imaginary cylinder which has a segment thereof defined by arcuate hopper bottom 15. In the embodiment of the invention shown for purposes of illustration, the axes of pivot between bracket assemblies 34 and respective hydraulic piston and cylinder assemblies 35 are colinear with each other and both of these axes are also coincident with cylinder axis 16.

It should be apparent that expanding and contracting of hydraulic piston and cylinder assemblies 35 cause movement of packer plate 22 along the guide tracks by reason of the rolling or sliding engagement of rollers 29 in respective guide tracks 30. It will also be apparent that expanding and contracting of hydraulic piston and cylinder assemblies 38 cause swinging or pivoting movement of the packer plate about a transverse axis defined by rod 28. The sequence in which packer plate 22 moves during each loading cycle is illustrated in FIGS. 2 to 5, inclusive.

Figure 2:
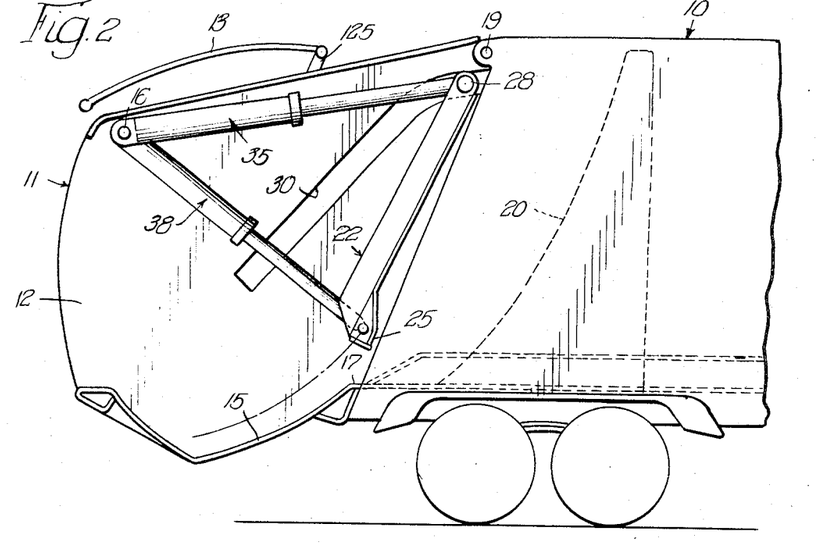
FIGS. 2 to 5, inclusive, are side elevational views, largely in schematic form, which show in sequence the several positions and movements of the packer plate during a loading cycle.

In FIG. 2, packer plate 22 is shown in its uppermost and foremost position. This is the position of the packer plate when the loading cycle has been completed and the loading and packing mechanism has come to rest, with the packer plate 22 holding the refuse compacted within the storage body 10 against compaction plate 20 therein. While the packer plate is in this position it is intended that refuse be dumped into hopper 11 through the rear opening 12 therein, either by hand or by power lifting of separate containers, as shown for example in Gollnick Patents No. 2,928,562 and No. 3,143,230.

Figure 3:
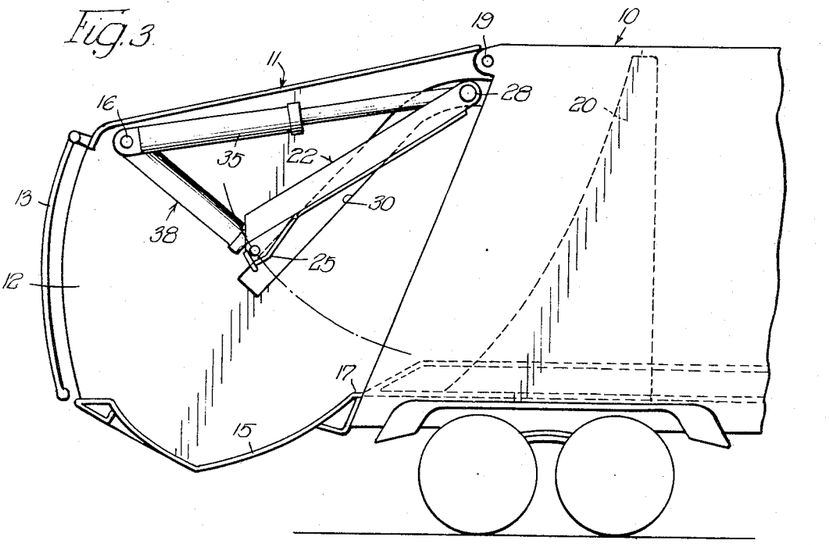

At the start of a loading cycle, piston and cylinder assemblies 38 are contracted for swinging the packer plate upwardly to the position illustrated in FIG. 3. During this movement of the packer plate, piston and cylinder assemblies 35 remain extended and accordingly the packer plate swings about a fixed axis defined by rod 28.

Figure 4:
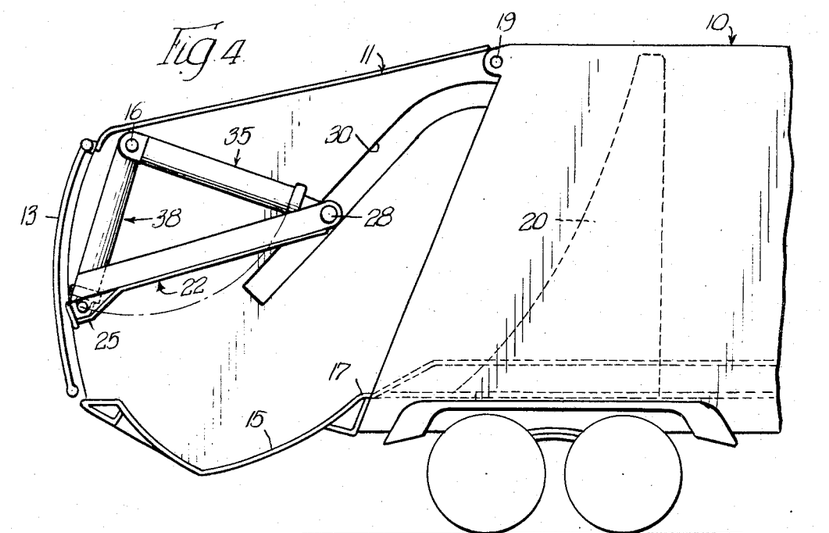

After the packer plate has reached the position illustrated in FIG. 3, piston and cylinder assemblies 35 are then contracted causing rollers 29 to roll along the guide tracks 30 for shifting the packer plate to the position illustrated in FIG. 4. As will be explained below, although the packer plate is mounted and powered for moving through its various positions automatically in completing a loading cycle, the packer plate may be momentarily stopped in its FIG. 4 position for the purpose of attaching a separate container to the packer plate to dump the former into the hopper upon movement of the packer plate through the remainder of its loading cycle. Such a separate container and the means for attaching the same to the loading hopper and the packer plate are fully disclosed in the aforementioned Gollnick patents.

Figure 5:
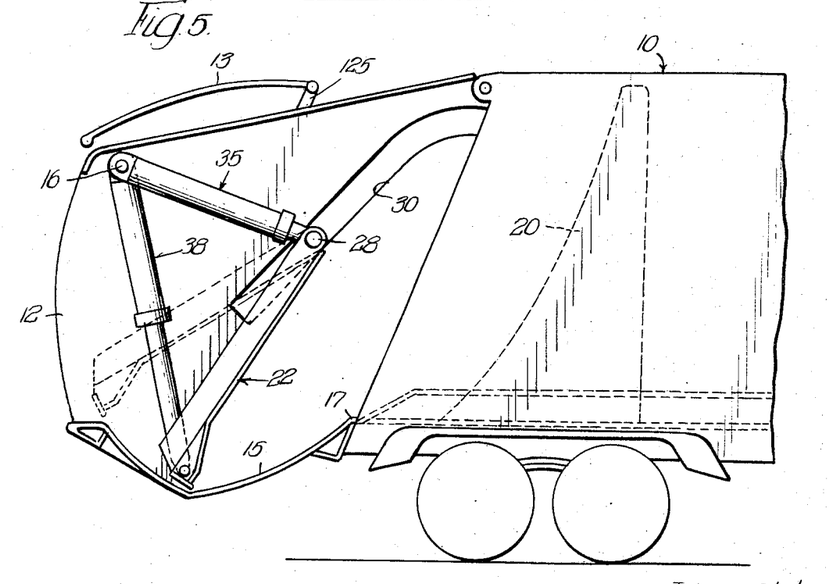

The loading cycle of the packer plate is continued by expanding piston and cylinder assemblies 38 whereupon the packer plate is swung to the position illustrated in FIG. 5. During this last mentioned movement of the packer plate, hydraulic piston and cylinder assemblies 35 remain contracted thereby to cause the packer plate to be swung about a transverse fixed axis defined by rod 28.

The loading cycle is completed by expanding hydraulic piston and cylinder assemblies 35 for shifting the packer plate back to the position thereof illustrated in FIG. 2. During this movement of the packer plate, hydraulic piston and cylinder assemblies 38 remain expanded whereby the trailing edge of the packer plate travels in an arcuate path having a radius defined by either of piston and cylinder assemblies 38.

It will be understood that during this final movement of the packer plate, the trailing edge thereof always travels in an arcuate path which is generally uniformly spaced from arcuate hopper bottom 15. This is because arcuate bottom 15 defines the segment of an imaginary, horizontally disposed cylinder having its longitudinal central axis represented by the numeral 16, and because the upper ends of piston and cylinder assemblies 38 pivot about axes which are substantially coincident with this longitudinal central axis of the imaginary cylinder. If for some reason piston and cylinder assemblies 38 are not permitted to expand fully in moving the packer plate from the FIG. 4 to the FIG. 5 positions, as for example if the trailing edge of the packer plate strikes an incompressible object in the refuse, the trailing edge of the packer plate will still travel in an arcuate path generally uniformly spaced from arcuate hopper bottom 15 because of the relationship between the arcuate hopper bottom 15 and the upper pivots of piston and cylinder assemblies 38 as just described. In actual practice, the upper pivot axes of cylinder assemblies 38 are located slightly rearwardly of imaginary cylinder axis 16. This is to prevent the upper pivot axes of assemblies 38 from being unintentionally located forwardly of cylinder axis 16 due to manufacturing tolerances, in which case the lip portion 25 of the packer plate would approach hopper bottom 15 during movement of the packer plate between its FIG. 5 and FIG. 2 positions; this could cause jamming if an incompressible object were to become lodged between lip 25 and hopper bottom 15. Since the upper pivot axes of cylinders 38 are located slightly rearwardly of cylinder axis 16, lip 25 actually moves in an arcuate path such that lip 25 is spaced a slightly greater distance from hopper bottom 15, when the packer plate approaches its FIG. 2 position, than the distance between lip 25 and bottom 15, when the packer plate is in its FIG. 5 position. It is within the spirit and scope of the invention, as defined by the appended claims, to locate the upper pivot axes of cylinder assemblies 38 at any location adjacent cylinder axis 16 so that lip 25 of the packer plate will travel in an arcuate path substantially or generally uniformly spaced from hopper bottom 15.

The arrangement of piston and cylinder assemblies 35 and 38 and the sliding and pivotal mounting of the packer plate cause the same to be moved rapidly during a loading cycle. During the last movement of the packer plate in its loading cycle, i.e. when the same moves from the FIG. 5 position to the FIG. 2 position, this speed of movement of the packer plate is traded for mechanical advantage to pack firmly the refuse within storage body 10 against compaction plate 20 therein. This feature is brought about by the upper curved portions of the guide tracks which curve generally horizontally toward the loading hopper. As the packer plate rollers 29 enter these upper curved portions of guide tracks 30, the packer plate commences moving in a path more or less parallel with the direction of movement of piston and cylinder assemblies 35. Therefore, the full expansion forces of piston and cylinder assemblies 35 are transferred to the packer plate. This provides for a very strong packing force at the end of the cycle when the resistance of the refuse in being compacted is the greatest.

Figure 6:
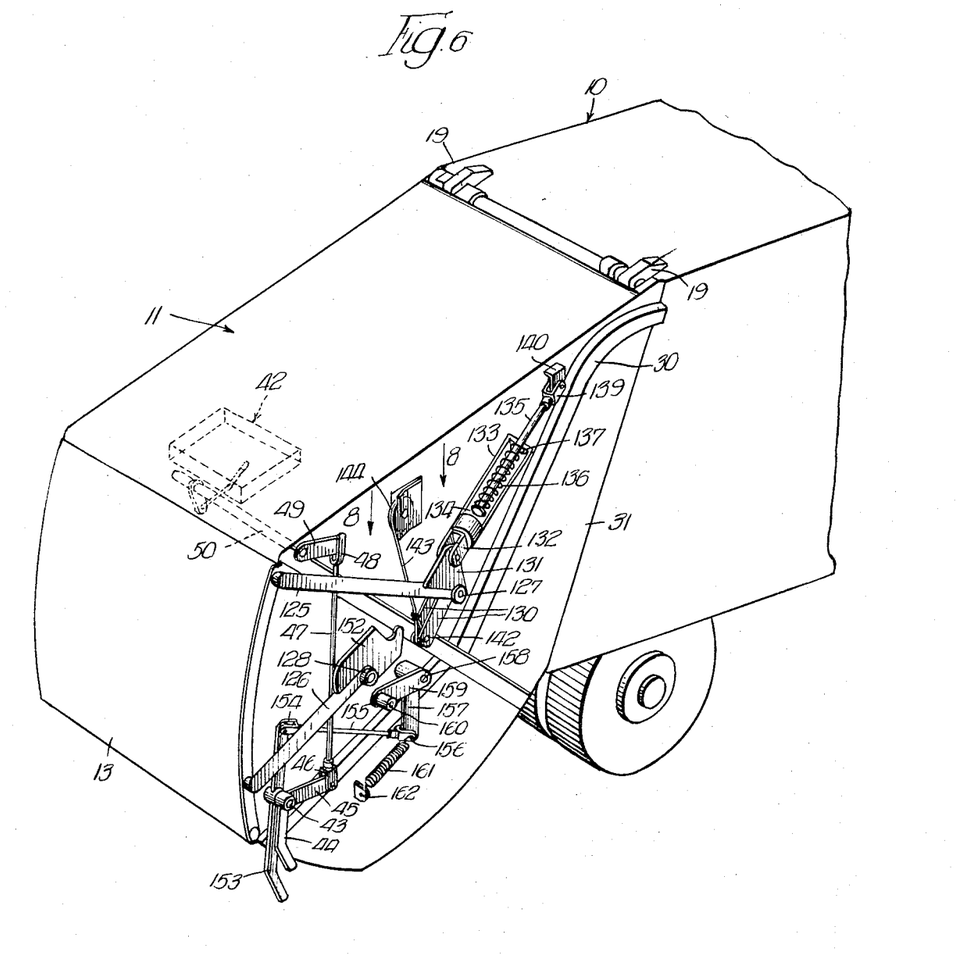
FIG. 6 is a perspective view similar to FIG. 1 and primarily illustrating the various arms and levers mounted on the right side of the loading hopper.
Figures 7, 8:
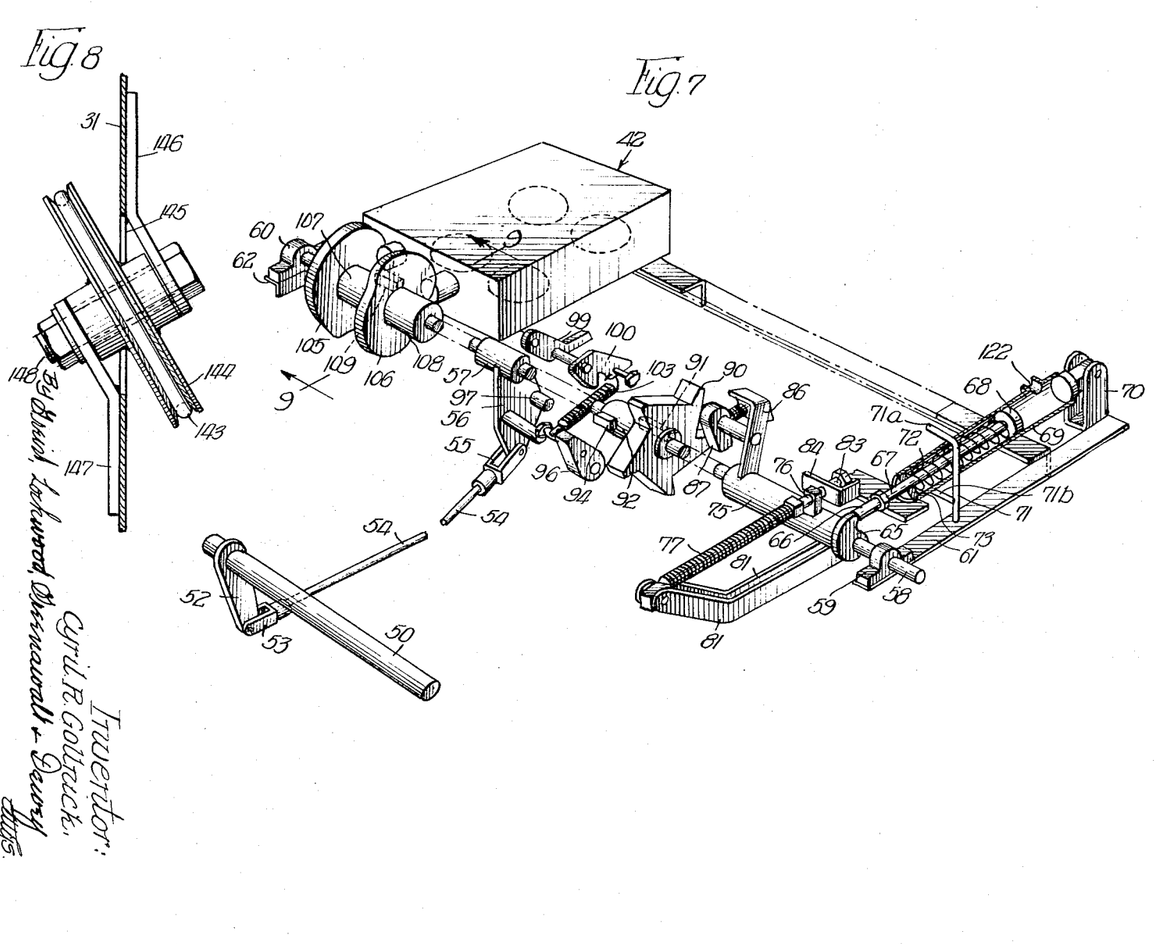
FIG. 7 is an enlarged, exploded, perspective view of mechanism for operating a directional control valve which is associated with the hydraulic cylinders provided for moving the packer plate.
FIG. 8 is an enlarged section taken along line 8—8 of FIG. 6.

Hydraulic piston and cylinder assemblies 35 and 38 are operated by a directional control valve generally designated 42 (FIGS. 6 and 7). The present invention also has to do with new and unique means for operating or actuating the directional control valve in an automatic manner thereby to cause automatic cycling of the packer plate through the various positions described above. The mechanism for operating directional control valve 42 will now be described.

As noted in FIG. 6, the right side 31 of loading hopper 11 mounts a pin or shaft 43, which pin pivotally mounts a right angle member consisting of a lever portion 44 and an arm portion 45. It will be understood that these two portions are connected together for movement in unison about an axis defined by pin 43. The free or distal end of arm 45 is pivotally received within a clevis 46 connected at the lower end of a rod 47. The upper end of rod 47 mounts a similar clevis 48 which pivotally receives one end of an arm 49. The other end of this arm is fixed to one end of a shaft 50 for rotating the latter. It should be apparent that when lever 44 is swung in a clockwise direction as viewed in FIG. 6, shaft 50 is rotated in a clockwise direction. Opposite movement of lever 44 of course rotates shaft 50 in an opposite or counterclockwise direction.

Referring now to FIG. 7, it will be seen that an arm 52 is fixed to shaft 50. At this time it should be mentioned that shaft 50 is journaled by suitable means (not shown) within the upper portion of loading hopper 11. Arm 52 has the free end thereof pivotally received within a clevis 53, which clevis is connected to one end of a rod 54. This rod mounts another clevis 55 pivotally receiving the free end of an arm 56. Arm 56 is secured to a hub or sleeve 57, which hub is freely rotatable on shaft 58.

Shaft 58 has opposite ends thereof rotatably mounted in a pair of journals 59 and 60, which journals are mounted on angle members 61 and 62, respectively. These angle members are suitably supported in the upper portion of loading hopper 11 and may form a part of the framework of the latter.

A cam 65 is rotatably mounted on shaft 58 adjacent the end thereof mounted in journal 59. The shape of cam 55 is best illustrated in FIG. 11; the cam will be seen to include a rounded tip 65a and a shoulder or heel portion 65b.

Figures 11, 12:
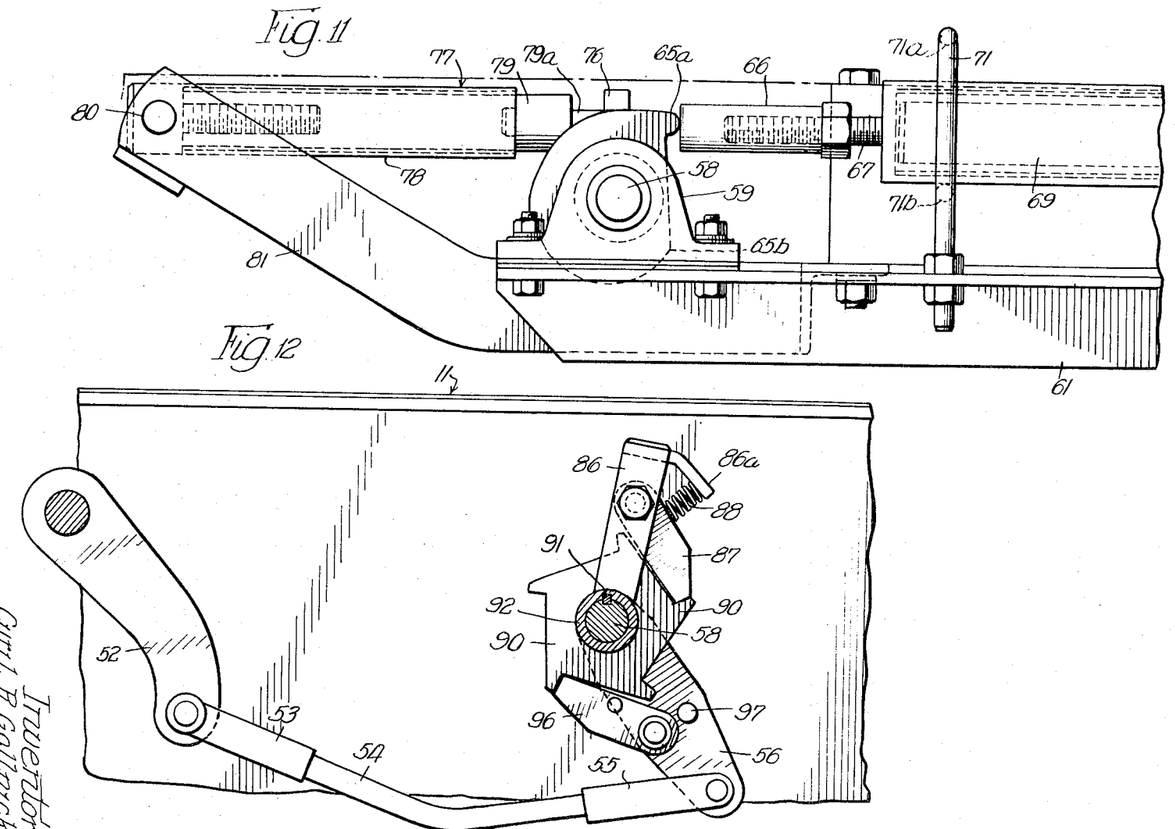
FIG. 11 is an enlarged view taken along line 11—11 of FIG. 10.
FIG. 12 is an enlarged section taken along line 12—12 of FIG. 10.

When cam 65 is in the position illustrated in FIGS. 7 and 11, tip 65a is engaged by a cylindrical member 66 adjustably mounted on one end of a piston rod 67. Piston rod 67 is connected to a piston 68 (FIG. 7) reciprocal within a fluid cylinder 69. Cylinder 69 has one end thereof pivotally mounted in a bracket 70, which bracket is suitably secured from supporting structure, as for example angle 61. It will be noted that angle 61 supports a rod 71 including leg portions 71a and 71b extending over and under cylinder 69, respectively, for limiting swinging movement of the latter. As best seen in FIG. 7, cylinder 69 encloses a coil spring 72, which spring encircles piston rod 67. One end of spring 72 abuts piston 68 and the other end of the spring abuts a member 73 which closes the free or swinging end of cylinder 69. Of course, member 73 has a central bore for accommodating piston rod 67.

Returning now to FIG. 7, a sleeve 75 is rotatably mounted on shaft 58 adjacent cam 65; actually sleeve 75 is secured to cam 65 for rotation in unison with the latter. Sleeve 75 supports a generally radially extending bar 76, which bar is engaged by one end of a spring assembly 77.

Figure 10:
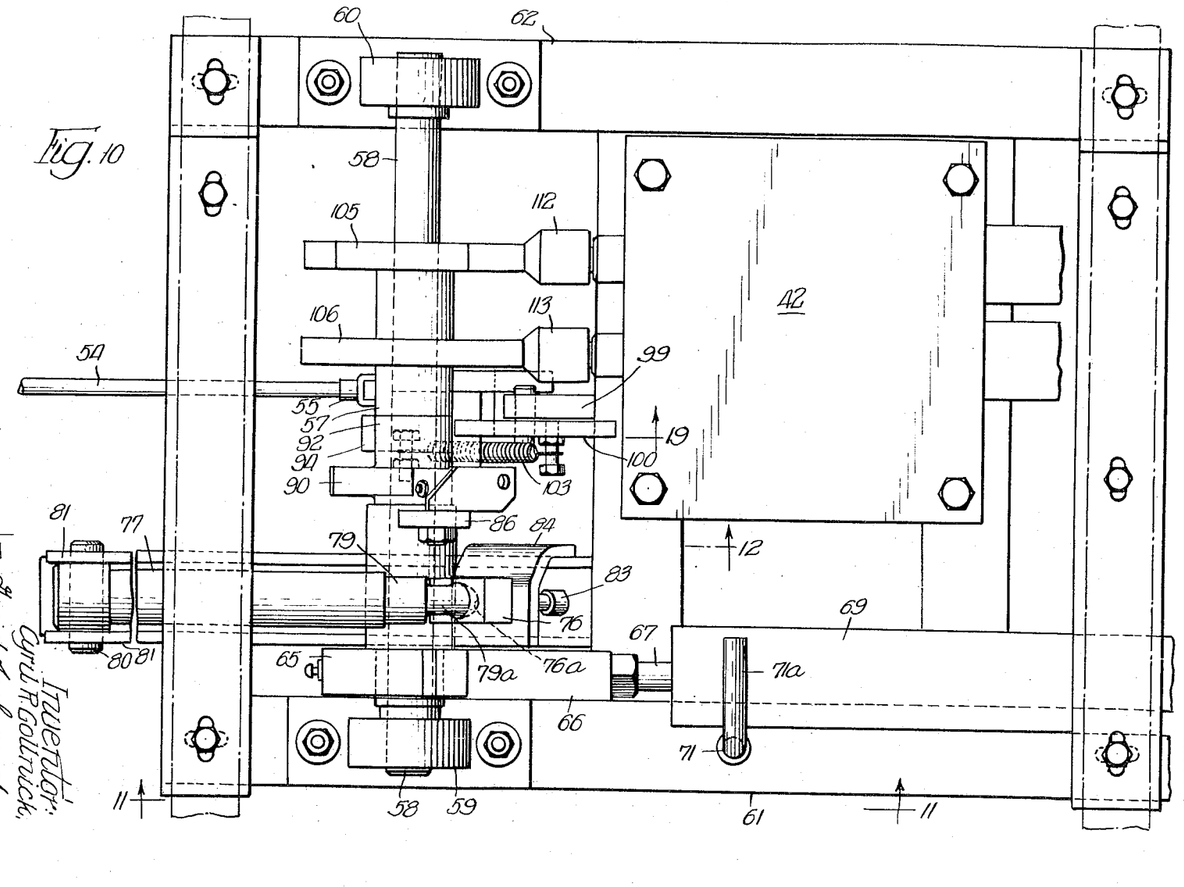
FIG. 10 is an enlarged top plan view of the mechanism illustrated in FIG. 7.

Spring assembly 77 is illustrated more or less schematically in FIG. 7. By referring to FIG. 11, the spring assembly will actually be seen to consist of a cylinder 78 slidably receiving another piston 79. Piston 79 includes a coaxial extension 79a having a rounded end rockably received within a rounded depression 76a (FIG. 10) in bar 76. Cylinder 78 houses a suitable spring or springs which engages piston 79 and urges the latter outwardly of cylinder 78. Cylinder 78 is pivotally supported about a pin 80 mounted in the ends of a pair of bracket arms 81. These bracket arms are secured to suitable supporting structure within the loading hopper 11. It should be apparent that spring assembly 77 acts to rotate sleeve 75 in a clockwise direction as seen in FIGS. 7 and 11.

A stop 83 in the form of a bolt is provided for being engaged by bar 76 thereby to limit movement of sleeve 75 in a clockwise direction as viewed in FIGS. 7 and 11. Bolt 83 is mounted in an appropriate supporting structure such as an angle bracket 84.

Sleeve 75 supports a generally radially extending arm 86, which arm pivotally mounts a pawl 87. As best noted in FIG. 12, arm 86 includes an integral extension 86a supporting one end of a spring 88; this spring engages pawl 87 for urging the same into engagement with a ratchet wheel 90.

Ratchet wheel 90, which includes five teeth, is mounted on shaft 58 and keyed thereto as by means of a key 91 (FIG. 7). Mounted on shaft 58 adjacent ratchet wheel 90 is a hub 92. This hub is also fixed onto the shaft by suitable means; the hub may form an integral part of ratchet wheel 90. As noted in FIG. 7, hub 92 mounts an axially extending stop bar 94.

Arm 56 mounts a pawl 96 (FIGS. 7 and 19), which pawl is also arranged for engagement with ratchet wheel 90. Arm 56 carries a pin 97 for a purpose to be explained hereinbelow.

Figure 19:
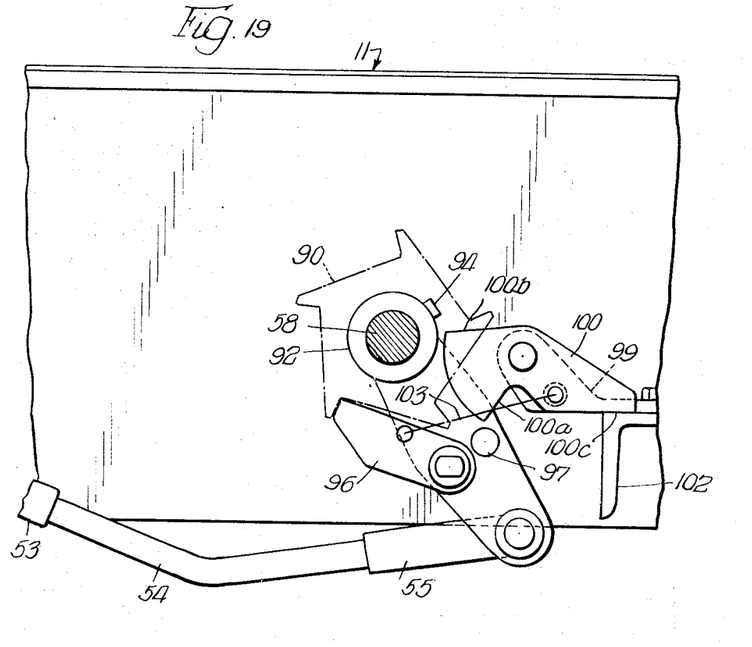
FIG. 19 is an enlarged section taken along line 19—19 of FIG. 10.

A bracket arm 99 (FIGS. 7 and 19) is suitably mounted from supporting structure adjacent shaft 58 and also adjacent hub 57 which mounts arm 56 on shaft 58. Bracket arm 99 pivotally mounts a catch plate 100. As best noted in FIG. 19, catch plate 100 includes a curved recess 100a. The catch plate also includes a surface 100b which is arranged to be engaged by stop bar 94 carried on hub 92. The catch plate 100 further includes a surface 100c arranged to abut or engage a structural member 102 forming part of the structural supporting framework within loading hopper 11, thereby to limit clockwise rotation of catch plate 100 as seen in FIG. 19. A spring 103 (illustrated in FIG. 7 and represented by a phantom line in FIG. 19) has one end thereof connected with pawl 96 and the other end thereof connected to catch plate 100. It will be apparent that spring 103 acts both to urge drive pawl 96 into engagement with the ratchet wheel and to urge the catch plate 100 in a clockwise direction, as viewed in FIG. 19, thereby yieldably to hold surface 100c thereof into engagement with structural member 102.

Figure 9:
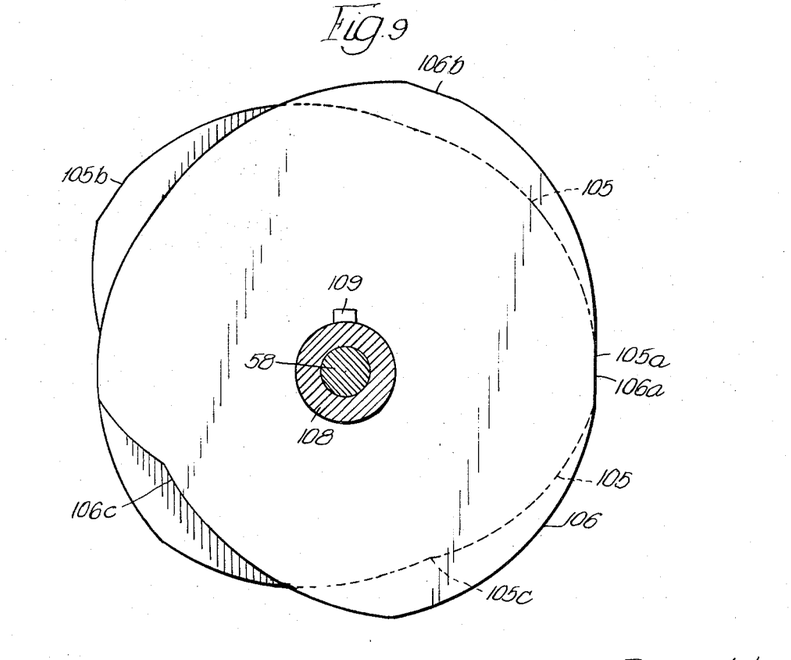
FIG. 9 is an enlarged section taken along line 9—9 of FIG. 7.

A pair of cams 105 and 106 are mounted on shaft 58. These cams are associated with respective hubs 107 and 108. It will be understood that the cams are fixed on shaft 58 for rotating the latter. The cams or their associated hubs may be keyed to the shaft. One such key is designated 109 and illustrated in FIGS. 7 and 9. It will be understood further that cams 105 and 106, which are illustrated in FIG. 9, are of similar construction. Cams 105, 106 each include a continuous peripheral surface having three so-called flat surfaces 105a, 105b, 105c and 106a, 106b, 106c, respectively. These three flat surfaces correspond to neutral, in and out positions of an associated valve spool forming a part of the directional control valve 42. As noted in FIGS. 7 and 10, cams 105 and 106 engage the ends of respective valve spools 112 and 113 forming a part of directional control 42. It will be realized that cams 105 and 106, although similar, are angularly offset relative to each other on shaft 58 as best illustrated in FIG. 9.

Referring to the schematic drawings in FIGS. 13 through 18, the valve spools will be seen to be slidably mounted within directional control valve 42 and urged outwardly of the same by respective springs 114 and 115. In other words, these springs maintain the outer ends of the valve spools in sliding engagement with the peripheral surfaces of respective cams on shaft 58.

The directional control valve 42 is not explained in detail herein as of itself it forms no part of the present invention and may be of well known construction. It will be understood that the refuse vehicle carries a hydraulic pump (not shown) and suitable conduits for forcing hydraulic fluid under pressure, represented by the letter P in FIGS. 13 through 18, to the directional control valve. Also, it will be understood that the refuse vehicle contains suitable return lines, represented by the letter R in schematic FIGS. 13 through 18 for returning the oil to a suitable reservoir tank for recirculation by the hydraulic pump. As noted in each of schematic FIGS. 13 through 18, the directional control valve 42 is connected with hydraulic piston and cylinder assemblies 35 by conduits 117 and 118. Likewise, in each of these figures the directional control valve is shown connected with hydraulic piston and cylinder assemblies 38 by conduits 119 and 120. At this time it should be mentioned that cylinder 69 is in communication with the line between the pump and the directional control valve by means of a hydraulic line 121 which joins cylinder 69 at opening 122 (FIG. 7).

Figure 13:
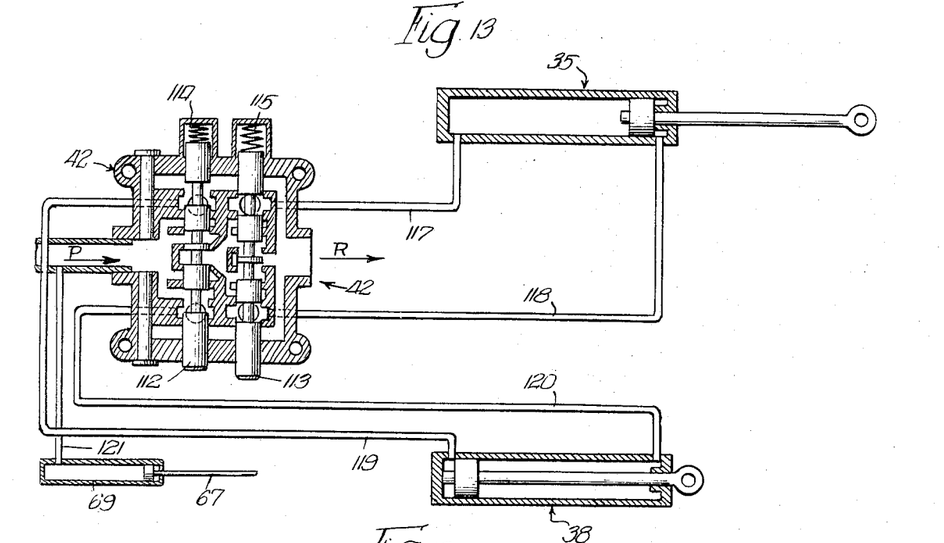
FIGS. 13 to 18, inclusive, are schematic views which show in sequence the operation of the directional control valve and the associated hydraulic cylinders which are connected with the packer plate for moving the same.

The operation of the mechanism for operating directional control valve 42 will now be described. Assume that packer plate 22 is in the position illustrated in FIG. 2. It will be recalled that the packer plate occupies this position at the start of a loading cycle. When the packer plate is in the FIG. 2 position, both valve spools 112 and 113 will be in the neutral position illustrated in FIG. 18. The packing cycle is commenced by the operator of the vehicle pulling lever 44 (FIG. 6) in a clockwise direction. This causes shaft 50 to be rotated in a clockwise direction as viewed in FIGS. 7 and 19, whereby arm 56 is also moved in a clockwise direction. This movement of arm 56 brings pawl 96 into driving engagement with the ratchet wheel and causes the ratchet wheel 90 to rotate shaft 58 to a position wherein cams 105 and 106 locate respective valve spools 112 and 113 as shown in FIG. 13. When ratchet wheel 90 is manually advanced as just described, pawl 87 merely ratchets over the ratchet wheel. In FIG. 13, valve spool 113 remains in its neutral position whereas valve spool 112 is forced inwardly thereby causing hydraulic piston and cylinder assemblies 38 to be retracted for swinging the packer plate to the position thereof illustrated in FIG. 3.

The FIG. 3 position of the packer plate is established by "bottoming" of piston and cylinder assemblies 38. The hydraulic pump associated with the packer plate hydraulic system continues to pump after assemblies 38 bottom, i.e. fully contract, thereby causing an increase in pressure in the line between the pump and directional control valve 42. This line is connected with cylinder 69 by hydraulic line 121, and therefore pressure in cylinder 69 is correspondingly increased.

As the pressure in cylinder 69 is built up, piston rod 67 is forced outwardly of cylinder 69. This outward movement of piston rod 67 causes counterclockwise movement of cam 65 (FIG. 11) thereby causing corresponding rotation of sleeve 75. During this rotation of sleeve 75, spring assembly 77 is compressed and pawl 87 is advanced toward the next tooth on ratchet wheel 90. After piston rod 67 has rotated cam 65 for approximately one-quarter of a revolution, cam heel 65b comes into engagement with cylindrical member 66 on the piston rod and thereby causes the latter to be disengaged from cam 65. When this occurs pawl 87 will have been advanced to a position where it is in driving engagement with the next tooth on ratchet wheel 90. Therefore, after member 66 on the piston rod separates from cam 65, spring assembly 77 acts immediately to rotate sleeve 75 in a clockwise direction as viewed in FIG. 12. Sleeve 75 carries pawl 87 and therefore the latter causes ratchet wheel 90 to be rotated in a clockwise direction. Movement of sleeve 75 and pawl 87 carried thereby is stopped by engagement of bar 76 with stop bolt 83.

Figure 14:
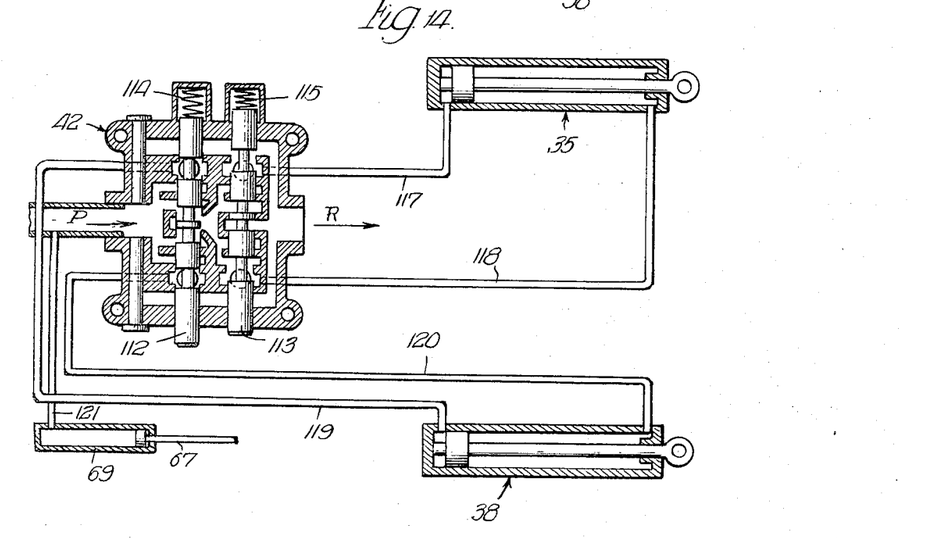
Figure 15:
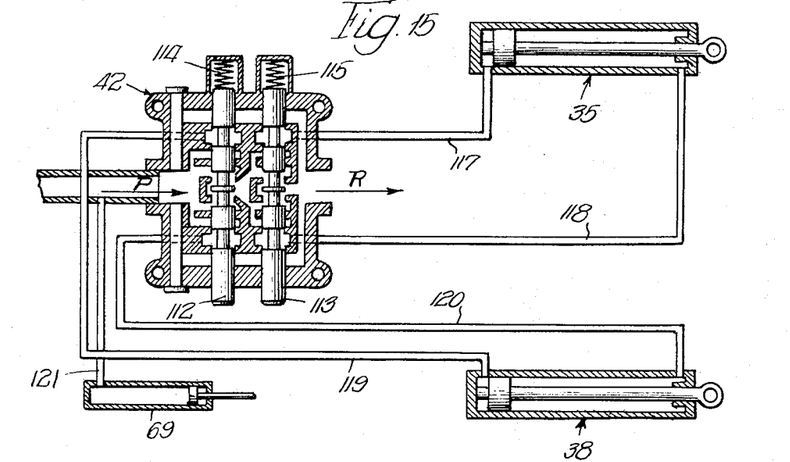

This movement of the ratchet wheel, i.e. movement of the ratchet wheel through one-fifth of the revolution, causes cams 105 and 106 to be rotated for positioning the valve spools as indicated in FIG. 14. When the valve spools are in their FIG. 14 position, valve spool 113 is also pushed inwardly of the directional control valve thereby causing retraction of piston and cylinder assemblies 35 for swinging packer plate 22 to the position illustrated in FIG. 4. As soon as the valve spools are positioned as illustrated in FIG. 14, piston and cylinder assemblies 35 commence contracting for moving the packer plate from its FIG. 3 to its FIG. 4 position. As soon as this occurs, the pressure between the pump and the directional control valve drops thereby causing a corresponding drop in pressure in cylinder 69. The pressure within cylinder 69 drops sufficiently to allow spring 72 to return piston rod 67 to its original position. As the piston rod 67 retracts, member 66 on the end thereof will drop over tip 65a and assume the position illustrated in FIG. 11.

When the pressure in the system again builds up as piston and cylinder assemblies 35 bottom and establish the position of packer plate 22 illustrated in FIG. 4, pressure is again built up in cylinder 69 for extending piston rod 67 and thereby causing ratchet wheel 90 to be advanced another fifth of a turn by pawl 87. After this occurs, the valve spools are positioned as illustrated in FIG. 16 whereupon piston and cylinder assemblies 38 are expanded for swinging packer plate 22 to the position illustrated in FIG. 5.

Figure 17:
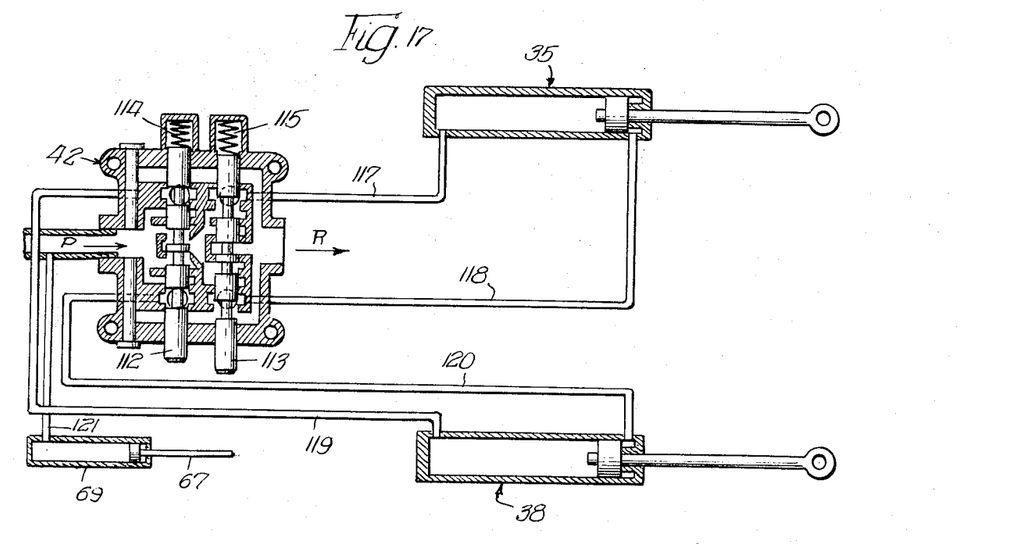
Figure 18:
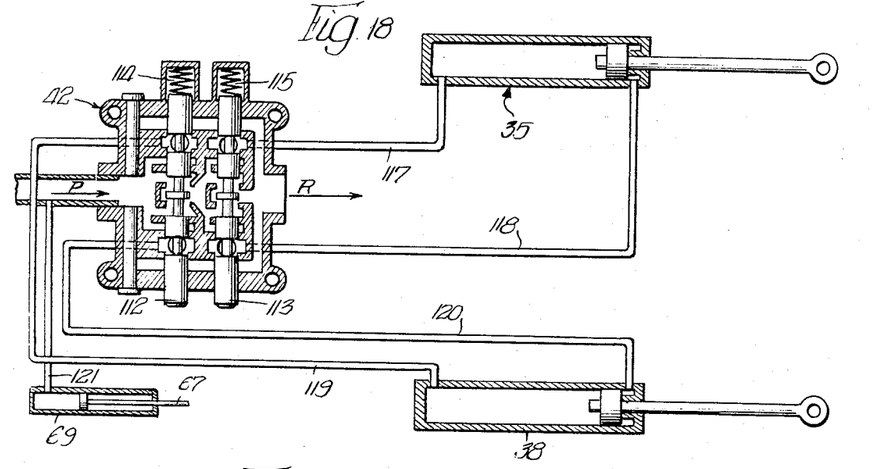

When the packer plate reaches the position illustrated in FIG. 5, the pressure again builds up in the hydraulic system, which pressure build-up also occurs in cylinder 69 for causing pawl 87 to rotate ratchet wheel 90 another fifth of a turn. As this occurs, valve spools 112 and 113 are located in the directional control valve as illustrated in FIG. 17, whereupon hydraulic piston and cylinder assemblies 35 are expanded for shifting the packer plate back to its position illustrated in FIG. 2. After the packer plater eaches the FIG. 2 position, the pressure in the hydraulic system experiences another pressure buildup for causing a corresponding pressure increase in cylinder 69 thereby to cause the ratchet wheel to be rotated another one-fifth of a turn. This final rotation of the ratchet wheel causes both valve spools to be returned to their neutral positions illustrated in FIG. 18, whereupon the packer plate will be held in the position illustrated in FIG. 2.

As mentioned above, it may be desirable to stop the packer plate in the FIG. 4 position to allow a separate loading container to be connected to the plate for dumping of the former. If it is desired to stop the packer plate in the FIG. 4 position, just after the packer plate leaves its FIG. 3 position, lever 44 is swung in a counterclockwise direction as illustrated in FIG. 6. This movement of lever 44 causes shaft 50 to be rotated in a counterclockwise direction as viewed in FIG. 7. This rotation of shaft 50 causes arm 56 to be swung in a counterclockwise direction about shaft 58, whereupon pin 97 carried by arm 56 is swung into recess 100a of catch plate 100. Accordingly, catch plate 100 will not be free to rotate in a counterclockwise direction, as viewed in FIG. 19, when surface 100b thereof is struck by stop bar 94 on hub 92. Bar 94 is located on shaft 58 such that the same will be stopped for locating valve spools 112 and 113 in the position illustrated in FIG. 15. This arrangement of the valve spools will cause the packer plate to be moved to and held in its FIG. 4 position. When pin 97 is not received in recess 100a, as stop bar 94 strikes surface 100b, the catch plate freely swings or rotates and allows passage of bar 94. Spring 103 yieldably holds surface 100c in engagement with structural member 102.

Figure 16:
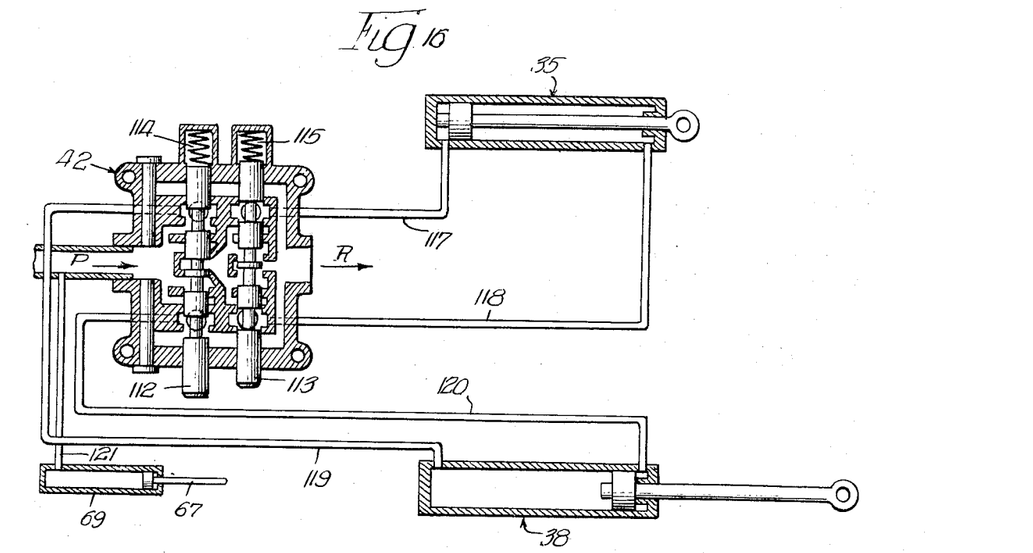

After a separate loading container has been connected to packer plate 22, the loading cycle is continued by swinging lever 44 fully in a clockwise direction whereupon pin 97 will be freed from recess 100a and pawl 96 will cause rotation of the ratchet wheel 90 through one-fifth of a turn thereby positioning the valve spools as shown in FIG. 16 for resuming the cycle of operation of the packer plate. It should also be mentioned at this time that the packing cycle can be accelerated at any time by swinging lever 44 in a clockwise direction thereby manually to advance the ratchet wheel to the next position thereof.

Figures 20, 21:
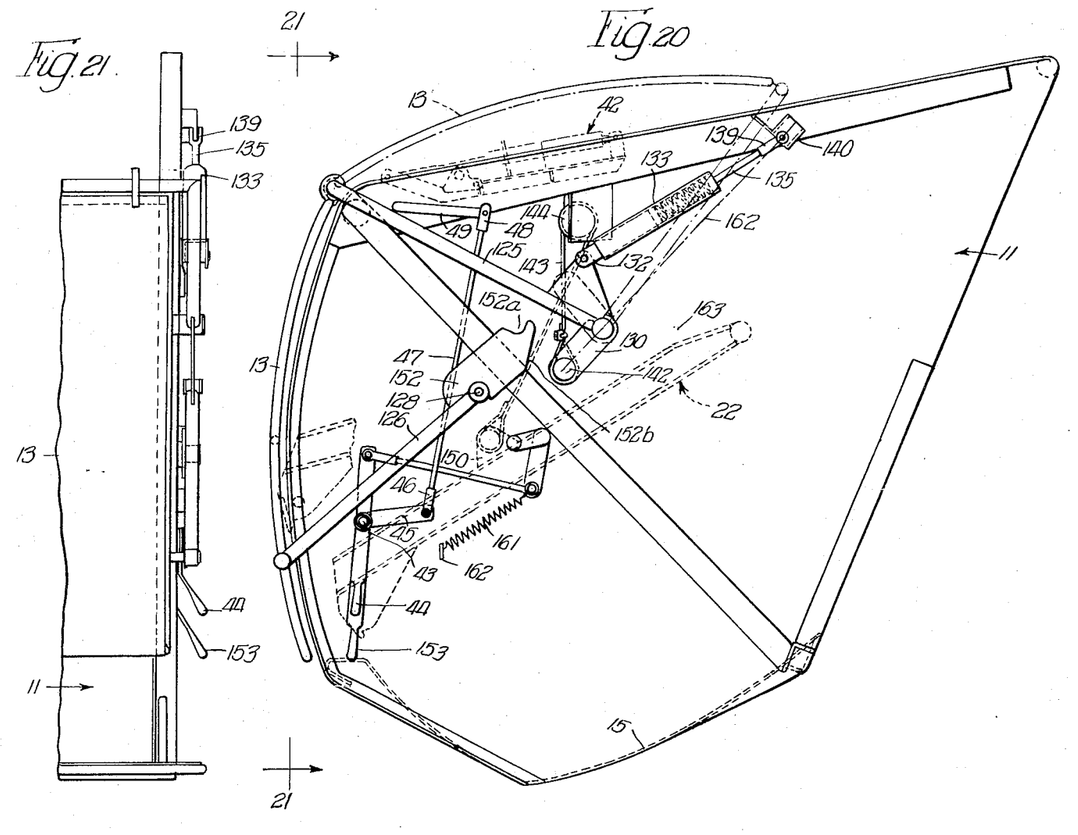
FIG. 20 is an enlarged side elevational view of the loading hopper as seen from the right-hand side thereof.
FIG. 21 is a fragmentary section taken along line 21—21 of FIG. 20.

The present invention also has to do with new and improved means for mounting the hopper door and connecting it with the packer plate to cause opening of the hopper door upon movement of the packer plate. Referring now to FIGS. 6 and 20, a pair of arms 125 and 126 are pivotally connected to hopper door 13 adjacent one side edge of the latter. Arm 125 is pivotally mounted on a pin or shaft 127, which pin is suitably secured to side wall 31 of hopper 11. Arm 126 is pivoted about a pin or shaft 128, this pin is suitably mounted from hopper side wall 31. Hopper door 13 is illustrated in its closed position in FIGS. 3, 4, 6 and 20. The open position of the door is illustrated in solid lines in FIGS. 2, 5 and in phantom lines in FIG. 20. It should be apparent that pivoting movement of arms 125 and 126 about their pivot axes permits movement of the door between its opened and closed positions.

A pair of parallel spaced arms 130 are secured to arm 125 adjacent the end thereof which is pivoted on pin 127. A plate 131 is also secured to arm 125 at the pivoted end of the latter. It will be understood that plates 130, 131 rotate in unison with arm 125 about the pivot axis defined by pin 127. Plate 131 is pivotally mounted to a clevis member 132, which clevis is fixed to one end of a cylinder 133. A piston 134 is mounted within cylinder 133, which piston includes a piston rod 135. A spring 136 encircles piston rod 135; one end of the spring abuts piston 134 and the other end of the spring abuts a member 137 which closes the end of cylinder 133. Piston rod 135 mounts a clevis 139, which clevis is pivotally engaged with a bracket 140 secured to side wall 31 of the hopper.

Arms 130 support a pin 142 which is received within a loop in one end of a cable 143. This cable extends along the outside of hopper wall 31 from pin 142 and is trained over a sheave 144. As best seen in FIG. 8, sheave 144 is mounted within an opening 145 in hopper wall 31 and at an angle with the latter. A pair of bent plates 146 and 147 are secured to the outside and inside, respectively, of wall 31 adjacent opening 145 therein. These plates support a shaft 148, which shaft rotatably mounts sheave 144. Cable 143 is trained over the sheave, extends along the inside of hopper wall 31 and is connected to a bracket 150 (FIGS. 1 and 20) secured to packer plate 22.

It will be understood that the hopper door construction thus far described will be found on the other side of the hopper. In other words, the hopper door is pivotally supported from both sides of the hopper and is connected to both side edges of the packer plate by the cables. Springs 136 urge the associated cylinders 133 upwardly thereby to urge the hopper door to its open position. These springs do not provide a sufficient force to open the hopper door. Rather, they serve as a counter balancing mechanism and, among other things, facilitate manual opening of the door.

As the packer plate leaves its FIG. 4 position, the slack is taken out of cables 143 which extend between the packer plate and the hopper door mounting mechanism. As the packer plate moves toward its FIG. 5 position, the cables pull upwardly on arms 130 thereby to swing the hopper door to its open position. The hopper door is swung to its full open position, illustrated in phantom lines in FIG. 20, when the packer plate reaches its FIG. 5 position. As the packer plate moves from its FIG. 5 to its FIG. 2 position, cables 143 become slack and therefore this further movement of the packer plate has no effect on the hopper door. Cables 143 remain in slack relation as long as the hopper door is open. Therefore, as long as the hopper door remains in its open position, movement of the packer plate has no effect on the hopper door.

Arm 126 on the right hand side of the hopper, i.e. arm 126 illustrated, has a plate 152 secured thereto at the end of the arm pivoted on pin 128. This plate includes a recess 152a and an inclined surface 152b. Pin 43 mounts a lever 153 intermediate the ends of the latter. Lever 153 is pivotally mounted on pin 43 between lever 44 and hopper wall 31. The upper end of lever 153 is pivotally connected with a clevis 154, which clevis is mounted on one end of a rod 155. The other end of rod 155 mounts a clevis 156; this clevis pivotally engages one end of an arm 157. The other end of arm 157 is suitably pivoted about a pin 158, which pin is mounted from hopper side wall 31. Another arm 159 also has one end thereof pivotally mounted on pin 158; arms 157 and 159 are connected together for movement in unison. The other end of arm 159 supports a pin or roller 160. A spring 161 has one end thereof connected to the lower end of arm 157. The other end of this spring is connected to a bracket or ear 162 mounted from hopper wall 31. Spring 161 acts to urge arms 157, 159 in a clockwise direction, as viewed in FIGS. 6 and 20, against a suitable stop (not shown).

When hopper door 13 is moved toward its open position, either manually or by movement of the packer plate as described above, surface 152b of plate 152 contacts roller 160 and thereby swings arms 157, 159 in a counter-clockwise direction against the resisting force of spring 161. As surface 152b passes roller 160 upon opening of the hopper door, spring 161 moves roller 160 into recess 152a of plate 152. This engagement between recess 152a and roller 160 serves to lock the hopper door in its open position.

When hopper door 13 is in its open position, the pivot axis between plate 131 and clevis 132, which is fixed to cylinder 133, is disposed to one side of a line extending between the pivot axis of plate 131 and the pivot axis of clevis 139, which clevis is secured to piston rod 135. This line is designated 162 in FIG. 20; the location of the pivot axis between plate 131 and clevis 132 when the hopper door is open is shown by numeral 163 in FIG. 20. Accordingly, when the door is fully open, springs 136 act to urge the door toward its closed position. These door closing forces are resisted by the engagement of roller 160 in recess 152a.

When it is desired to release the hopper door for closing of the same, lever 153 is swung in a clockwise direction thereby releasing roller 160 from recess 152a, whereupon springs 136 act to start the door toward its closed position. After the hopper door has started moving under the influence of springs 136, the door reaches a position such that gravity acts to return the door to its fully closed position. It will be understood that upon closing of the door, the pivot axis between plate 131 and clevis 132 will move to the other side of line 162 extending between the axis of pivot of plate 131 and the axis of pivot of clevis 139. Accordingly, after the pivot axis between plate 131 and clevis 132 passes to the other side of line 162, springs 136 act to restrain closing of the door thereby to prevent sharp or abrupt closing of the latter. It will be seen that cylinders 133 and plates 131, etc. act as an over-center linkage mechanism in counterbalancing the weight of the hopper door.

While the invention has been shown in but one form, it will be obvious to those skilled in the art that it is not to be so limited. On the contrary, the invention is susceptible of various changes and modifications without departing from the spirit and scope of the appended claims.

I claim:

1. In a refuse vehicle having a storage body and a loading hopper adjacent and in communication with the body, a packer plate in said hopper extending between opposite side walls of the latter, said plate having opposite side edges adjacent said side walls, respectively, and said plate having opposite leading and trailing edges, a pair of sliding pivots mounted on said plate adjacent respective side edges thereof, a pair of inclined guide tracks supported by respective side walls of the hopper and receiving said pivots, respectively, thereby to mount said plate for both sliding movement along said tracks and for pivoting movement about said pivots, the improvement comprising, powered means pivoted at one end thereof to the hopper and pivoted at the other end thereof to said plate adjacent said pivots, which powered means cooperate with said guide tracks for sliding said plate in both directions therealong, other powered means pivoted at one end thereof to the hopper and pivoted at the other end thereof to said plate adjacent the trailing edge thereof for pivoting said plate about said pivots.

2. In a refuse vehicle having a storage body, a loading hopper adjacent and in communication with the body, which hopper has opposite side walls and an arcuate bottom, a packer plate in said hopper extending between said side walls, said plate having forward and rearward edges and opposite side edges adjacent said side walls, respectively, a pair of sliding pivots mounted on said plate adjacent side edges thereof, a pair of inclined guide tracks supported by respective side walls of the hopper and receiving said pivots, respectively, thereby to mount said plate for both sliding movement along said tracks and for pivoting movement about said pivots, the improvement comprising, powered means having one end thereof pivoted to the hopper and the other end thereof pivoted to said plate adjacent said pivots, which powered means cooperate with said tracks for sliding said plate in either direction therealong, other powered means pivoted at one end thereof to said plate nearer said rearward edge than said forward edge and pivoted at the other end thereof to said hopper closely adjacent the longitudinal central axis of an imaginary cylinder having a segment thereof defined by said arcuate bottom.

3. In a refuse vehicle having a storage body, a loading hopper adjacent and in communication with the body, which hopper has opposite side walls and an arcuate bottom joining with the bottom of said body, which arcuate bottom defines a segment of a horizontally disposed imaginary cylinder, a packer plate in said hopper extending between said side walls, said plate having forward and rearward edges and opposite side edges adjacent said side walls, respectively, a pair of sliding pivots mounted on said plate adjacent respective side edges thereof, a pair of guide tracks mounted by respective side walls of the hopper in downwardly and rearwardly inclined relation with the latter, said sliding pivots having received in respective guide tracks thereby mounting said plate for both sliding movement along said tracks and for pivoting movement about said pivots, the improvement comprising, elongated movable means having one end thereof pivoted to the hopper and the other end thereof pivoted to said plate adjacent said pivots, which movable means cooperate with said tracks for sliding said pivots in both directions therealong, other elongated movable means pivoted at one end thereof to said plate intermediate said pivots and said rearward edge and pivoted at the other end thereof to said hopper closely adjacent the longitudinal central axis of said cylinder.

4. In a refuse vehicle having a storage body, a loading hopper adjacent and in communication with said body, which hopper has opposite side walls and an arcuate bottom joining with the bottom of said body, a packer plate in said hopper extending between said side walls, which packer plate has opposite leading and trailing edges, the improvement comprising, movable members engaged with said plate and adapted in one operation thereof to guide the trailing edge of said plate in a first arcuate path generally uniformly and closely spaced from said arcuate bottom, said movable members being adapted in another operation thereof to guide the trailing edge of said plate in a second arcuate path generally uniformly spaced from said arcuate bottom a substantially greater distance than said first arcuate path, which paths describe segments of a pair of imaginary, substantially coaxial cylinders, and means including other movable members engaged with said plate for moving the trailing edge thereof back and forth between said paths.

5. The combination according to claim 4 wherein said movable members and said other movable members comprise separate fluid operated cylinders and wherein said means comprise stationary guide tracks on the hopper side walls and associated sliding pivots on the packer plate.

6. In a refuse vehicle having a storage body, a loading hopper adjacent and in communication with said body, which hopper has opposite side walls and an arcuate bottom joining with the bottom of said body, a packer plate in said hopper extending between said side walls, which packer plate has opposite leading and trailing edges, the improvement comprising, means including movable members engaged with said plate for moving the leading edge thereof in both directions along a path extending downwardly and rearwardly of the hopper, other members engaged with said plate, said other members being adapted in one operation thereof to guide the trailing edge of said plate along a first arcuate path generally uniformly and closely spaced with said arcuate bottom, said other members being adapted in a second operation thereof to guide the trailing edge of said plate along a second arcuate path generally uniformly spaced from said arcuate bottom a substantially greater distance than said first arcuate path, which paths describe segments of substantially coaxial imaginary cylinders.

7. The combination according to claim 6 wherein said movable members and said other movable members comprise separate fluid operated cylinders, and wherein said means include sliding pivots on the packer plate and associated guide tracks on the hopper side walls, which tracks extend in parallel relation with said first mentioned path and thereby define the same.

8. In a refuse vehicle having a storage body and an adjacent loading hopper in communication with the body, a packer plate in said hopper extending between opposite side walls of the latter, which hopper has an arcuate bottom defined by a segment of a horiozntally disposed imaginary cylinder, said packer plate having opposite side edges and opposite leading and trailing edges, a pair of sliding pivots secured to said plate adjacent respective side edges thereof, which pivots are nearer said leading edge than said trailing edge, a pair of guide tracks mounted from respective side walls of the hopper and extending in downwardly or rearwardly inclined relation with the latter, said pivots being received in respective guide tracks for sliding and pivoting movement therein, the improvement comprising, at least one fluid operated cylinder having one end thereof pivoted to said plate adjacent the trailing edge thereof, which fluid operated cylinder has its other end pivotally mounted in said hopper about an axis substantially coincident with the longitudinal central axis of the aforementioned imaginary cylinder, at least one other fluid operated cylinder having one end thereof pivoted to said plate adjacent said pivots, said other fluid operated cylinder having the other end thereof pivotally mounted in said hopper about an axis parallel with and adjacent to said axes.

9. The combination according to claim 8 wherein the upper ends of said guide tracks are curved toward the storage body of the refuse vehicle.

10. The improvement according to claim 4 further defined by, said movable members and said other movable members comprising first and second fluid-operated cylinders, respectively, a directional control valve operatively associated with said fluid cylinders for sequentially operating the latter, which control valve includes a movable control member, a cam associated with said control member and adapted upon rotation to cause movement of the latter, first means associated with said cam and including biasing means for rotating the same, and second means responsive to pressure in said cylinders and associated with said first means for actuating the latter when the pressure in either cylinder exceeds a predetermined value.

11. The improvement according to claim 4 further defined by, said movable members and said other movable members comprising first and second fluid-operated cylinders, respectively, a directional control valve operatively associated with said fluid cylinders for operating the latter, which control valve slidably supports at least one valve spool, a shaft rotatably mounted adjacent said control valve, a cam fixed on said shaft and engaged with said valve spool for sliding the latter upon rotation of said shaft, a ratchet wheel fixed on said shaft for rotating the latter, a sleeve adjacent said ratchet wheel and mounted on said shaft for rotation relative thereto, a pawl carried by said sleeve so that when the latter is rotated in one direction the pawl engages the teeth of the ratchet wheel for rotating the same and so that when the sleeve is rotated in an opposite direction the pawl rides over the ratchet wheel teeth, a spring associated with said sleeve and acting to rotate the same in said one direction, an actuating cylinder also associated with said sleeve for rotating the same in said opposite direction, which actuating cylinder is in communication with said fluid cylinders for responding to pressure build-up in the latter.

12. The invention according to claim 11 wherein said actuating cylinder is pivotally mounted and includes a piston rod and wherein said sleeve includes an arm releasably engaged by the outer end of said rod, said arm being shaped to cause separation of the rod therefrom after said sleeve has been rotated in said opposite direction whereupon said sleeve is free to be rotated in said one direction by said spring.

13. The invention according to claim 11 further defined by, an arm mounted on said shaft for pivoting movement about the shaft relative thereto, which arm is adjacent said ratchet wheel, another pawl carried by said arm and being engageable with the teeth of the ratchet wheel to rotate the same when said arm is pivoted in one direction, movable means mounted adjacent said shaft for locking and releasing the latter, said arm having a member thereon engageable with said movable means for causing the latter to lock said shaft when said arm is pivoted in a direction opposite said one direction.

14. The improvement according to claim 8 further defined by, a directional control valve having a pair of chambers slidably supporting respective valve spools, means communicating said chambers with said one and other cylinders, respectively, a shaft rotatably supported by said hopper in adjacent relation with said control valve, a pair of cams fixed on said shaft, which cams are engaged with respective valve spools for sliding the latter upon rotation of the shaft, a ratchet wheel fixed on said shaft for rotating the latter, first means mounted on said shaft for rotation relative thereto and supporting a pawl engageable with the teeth of the ratchet wheel for rotating the latter when said first means is rotated in one direction, spring means associated with said first means for rotating the latter in said one direction, an actuating cylinder engaged with said first means by releasable means, said actuating cylinder being adapted upon actuation to rotate said first means in a direction opposite said one direction, said releasable means being adapted to cause disengagement of said actuating cylinder from said first means after the latter has been rotated in said opposite direction a predetermined amount whereupon said first means is free to be rotated in said one direction by said spring means, means communicating said one and other cylinders with said actuating cylinder so that the latter is actuated by pressure increase in either of said one or other cylinders.

15. The improvement according to claim 4 further defined by, a hopper door mounted on said hopper for movement between opened and closed positions, counterbalance means connected with said door by over-center linkage and thereby acting to urge the door open when the same is closed and to urge the door closed when the same is opened, and means connecting the packer plate with the hopper door for opening the same upon movement of the packer plate.

16. The improvement according to claim 6 further defined by, a hopper door and means supporting the same from said hopper for movement between opened and closed positions, said supporting means including an arm mounted at one end thereof for pivoting movement about a fixed pivot, an elongated spring assembly having one end thereof pivotally attached to the other end of said arm and having the other end thereof pivotally mounted to said hopper, said spring assembly and said arm being on one side of a dead center position when said door is closed and being on the other side of the dead center position when said door is open, said spring assembly being adapted constantly to exert a pulling force on said other end of said arm for urging said door to its opened position when the same is closed and for urging said door to its closed position when the same is open, and means connecting said packer plate with said hopper door supporting means so that movement of the former causes the hopper door to be moved to its opened position.

References Cited
UNITED STATES PATENTS

| | | | |
|---|---|---|---|
| 2,649,216 | 8/1953 | Gollnick | 214—83.3 X |
| 3,092,269 | 6/1963 | Brown et al. | 214—83.3 |
| 3,143,230 | 8/1964 | Gollnick | 214—83.3 |
| 3,249,243 | 5/1966 | Herpich et al. | 214—503 X |

FOREIGN PATENTS

| | | |
|---|---|---|
| 1,144,492 | 10/1957 | France. |

GERALD M. FORLENZA, *Primary Examiner.*

ALBERT J. MAKAY, *Examiner.*

UNITED STATES PATENT OFFICE
CERTIFICATE OF CORRECTION

Patent No. 3,348,708                                           October 24, 1967

Cyril R. Gollnick

It is hereby certified that error appears in the above numbered patent requiring correction and that the said Letters Patent should read as corrected below.

Column 6, line 28, for "a" read -- an --; column 8, line 56, for "eaches" read -- reaches --; column 11, line 39, after "adjacent" insert -- respective --.

Signed and sealed this 3rd day of December 1968.

(SEAL)
Attest:

Edward M. Fletcher, Jr.             EDWARD J. BRENNER
Attesting Officer                   Commissioner of Patents